(12) United States Patent
Durfee

(10) Patent No.: US 7,544,026 B2
(45) Date of Patent: Jun. 9, 2009

(54) DRILL BIT SCREW TIP

(75) Inventor: Laverne R. Durfee, Harmony, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/674,172

(22) Filed: Feb. 13, 2007

(65) Prior Publication Data

US 2008/0193236 A1    Aug. 14, 2008

(51) Int. Cl.
*B27G 15/02*    (2006.01)
(52) U.S. Cl. .................... 408/214; 408/201
(58) Field of Classification Search ............. 408/201, 408/211–214, 226, 225, 227, 223, 224, 1 R; *B27G 15/00, B27G 15/02; B23B 51/02*
See application file for complete search history.

(56) References Cited

U.S. PATENT DOCUMENTS

| 95,379 | A | * | 9/1869 | Richardson ............... 408/201 |
| 111,099 | A | * | 1/1871 | Walch ...................... 408/195 |
| 166,378 | A | * | 8/1875 | Higgins .................... 408/213 |
| 254,184 | A | * | 2/1882 | Wood et al. ............... 408/213 |
| 329,660 | A | * | 11/1885 | Lord ......................... 408/213 |
| 787,664 | A |   | 4/1905 | Converse |
| 808,245 | A | * | 12/1905 | Lund ......................... 408/201 |
| 1,164,659 | A | * | 12/1915 | Moore ..................... 144/24.12 |
| 1,165,854 | A |   | 12/1915 | Davis |
| 1,389,578 | A |   | 9/1921 | Charlton |
| 1,398,156 | A | * | 11/1921 | Schroder ................... 408/222 |
| 2,335,741 | A | * | 11/1943 | Pasquale ................... 408/222 |
| 2,577,986 | A |   | 12/1951 | Wilson |
| 2,618,304 | A |   | 11/1952 | Wilson |
| 2,627,292 | A |   | 2/1953 | Kronwall |
| 3,966,350 | A |   | 6/1976 | Benjamin |
| 4,066,379 | A |   | 1/1978 | Prohaska |
| 4,488,840 | A |   | 12/1984 | Pollington |

(Continued)

FOREIGN PATENT DOCUMENTS

DE    29700943 U1 *    3/1997

(Continued)

OTHER PUBLICATIONS

Blackburn, Ian, Examiner, Patents Act 1977: Search Report Under Section 17, Jun. 12, 2008, UK Intellectual Property Office.

(Continued)

*Primary Examiner*—Daniel W Howell
(74) *Attorney, Agent, or Firm*—Dennis J. Williamson; Moore & VanAllen, PLLC

(57) ABSTRACT

A drill bit comprises a shank having a longitudinal axis. A cutting head is formed at one end of the shank. A removable and replaceable pilot tip such as a screw tip or pilot point is formed on the cutting head. The pilot tip is designed for controlled failure. A tool is also provided for removing the broken tip. A kit comprising a dill bit adapted to receive a removable tip, a removable tip for attachment to the cutting head, and/or a removal tool for removing a broken tip from the drill bit. A method for removing a tip from a drill bit and replacing it with another tip is also provided.

13 Claims, 6 Drawing Sheets

U.S. PATENT DOCUMENTS

| | | | | |
|---|---|---|---|---|
| 4,625,593 | A | * 12/1986 | Schmotzer | 76/108.6 |
| 4,762,444 | A | * 8/1988 | Mena | 408/59 |
| 5,152,642 | A | * 10/1992 | Pitts et al. | 408/226 |
| 5,228,812 | A | 7/1993 | Noguchi et al. | |
| 5,234,293 | A | * 8/1993 | Mena | 408/57 |
| 5,700,113 | A | 12/1997 | Stone et al. | |
| 5,820,319 | A | 10/1998 | Hull et al. | |
| 5,906,146 | A | 5/1999 | Arlen | |
| 5,975,813 | A | 11/1999 | Schmotzer | |
| 6,024,520 | A | 2/2000 | Haughton et al. | |
| 6,098,499 | A | 8/2000 | Pool | |
| 6,341,926 | B1 | * 1/2002 | Liu | 408/226 |
| 6,361,255 | B1 | 3/2002 | Schmotzer | |
| 6,485,235 | B1 | 11/2002 | Mast et al. | |
| 6,612,788 | B2 | * 9/2003 | Thomas et al. | 408/214 |
| 6,652,202 | B2 | 11/2003 | Remke et al. | |
| 6,874,978 | B2 | * 4/2005 | Gongola | 408/144 |
| 2003/0035694 | A1 | 2/2003 | Liao et al. | |
| 2004/0208716 | A1 | 10/2004 | Krenzer | |
| 2005/0249563 | A1 | 11/2005 | Scott et al. | |

FOREIGN PATENT DOCUMENTS

| | | | |
|---|---|---|---|
| JP | 06210509 A | * | 8/1994 |
| JP | 2002172514 A | * | 6/2002 |
| WO | WO8403461 A1 | * | 9/1984 |

OTHER PUBLICATIONS

Intellectual Property Office, Search Report, Dec. 12, 2008.

* cited by examiner

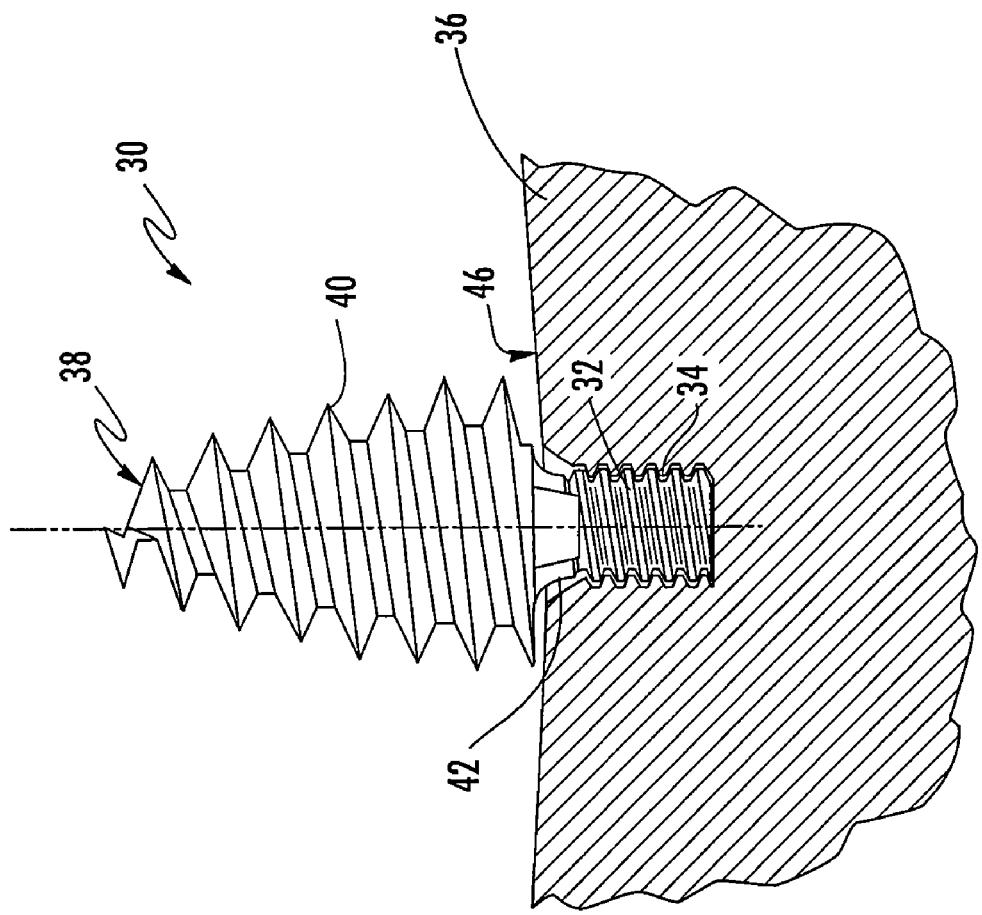
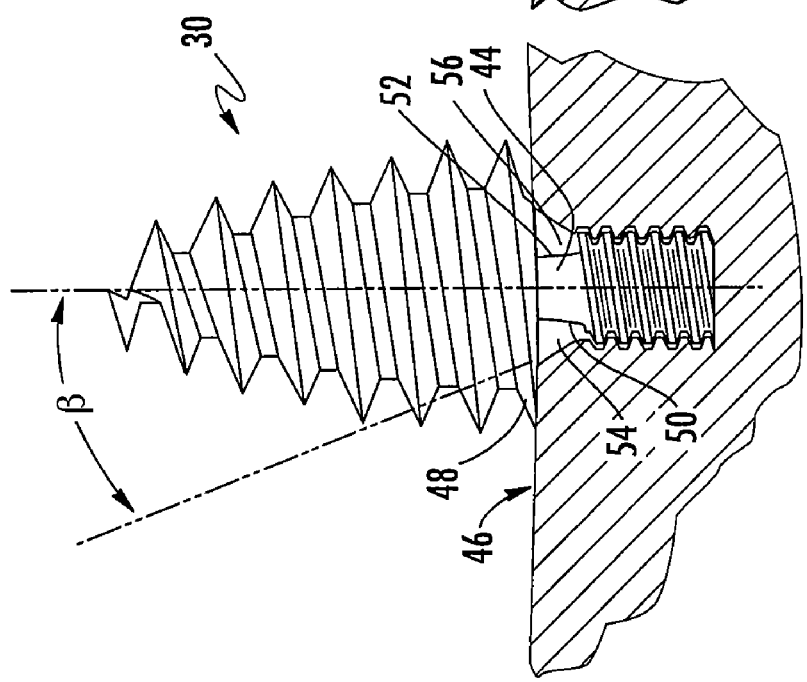
FIG. 4
FIG. 5

DRILL BIT SCREW TIP

The invention relates generally to drill bits and, more particularly, to drill bits with an improved screw tip.

BACKGROUND OF THE INVENTION

Drill bits for boring holes of preselected diameters in a workpiece are known. Such bits come in a variety of styles. One type of bit is known as a wood auger. This type of bit includes a shank that has one end adapted to be connected to a chuck of a rotary tool such as a drill or power driver. The opposite end of the shank supports a wood auger that comprises a flute that terminates in a cutting face for cutting a bore in the workpiece. Another type of bit is known as a spade bit or paddle bit. This type of bit includes a shank that has one end adapted to be releasably connected to a chuck of a rotary tool such as a drill or driver. The opposite end of the shank supports a cutting member where the cutting member is a substantially flat, relatively thin blade. Yet another type of bit is a fluted bit that has a plurality of flutes formed in spirals around the longitudinal axis of the bit. The flutes define cutting edges for cutting the workpiece. The drill bits may also be formed with a pilot tip such as a screw tip or pilot point along their longitudinal axis for guiding the bit into and through the workpiece. Such tips may be made replaceable such that if the tip is broken or otherwise damaged it can be removed and a new tip attached.

While various types of drill bits are known, an improved bit with a replaceable tip is desired.

SUMMARY OF THE INVENTION

A drill bit comprises a shank having a longitudinal axis. A cutting head is formed at one end of the shank. A removable and replaceable pilot tip such as a screw tip or pilot point is formed on the cutting head. The pilot tip is designed for controlled failure and is adapted to receive a tool for removing the broken tip.

A kit may comprise a drill bit adapted to receive a removable tip, a removable tip for attachment to the cutting head, and a removal tool for removing a broken tip from the drill bit. The kit may also comprise a plurality of removable tips for engaging a cutting head of a drill bit, and a removal tool dimensioned to engage tip for removing a broken tip from a drill bit.

A method for removing a tip from a drill bit comprises providing a cutting head on the drill bit and a tip having a controlled break point. A cavity is provided between the tip and the cutting head for receiving a tool. A tool is inserted into the cavity to remove the tip from the cutting head. Another tip is inserted into the cutting head.

BRIEF DESCRIPTION OF THE DRAWINGS

FIG. 4 is a partial section front view of one embodiment of a pilot tip of the invention.

FIG. 5 is a partial section side view of the embodiment of a pilot tip of FIG. 4.

BRIEF DESCRIPTION OF THE DRAWINGS

Figure 1:
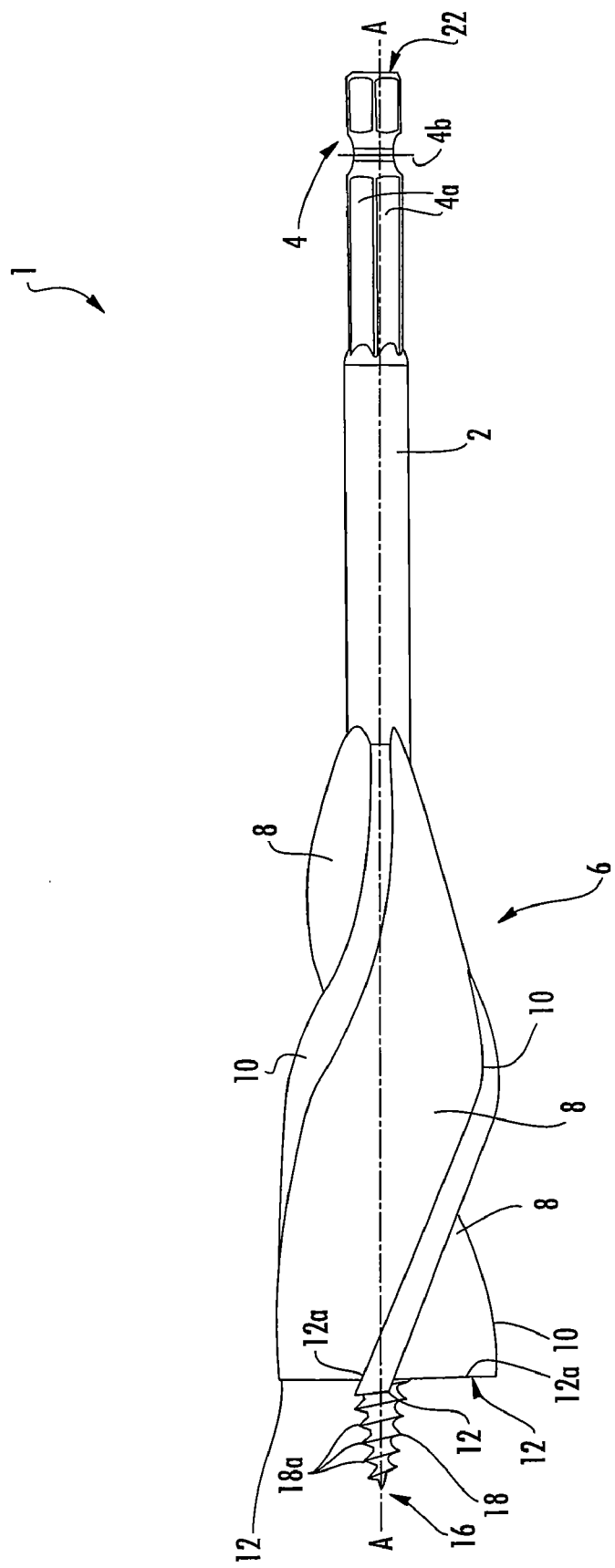
FIG. 1 is a side view of one embodiment of the drill bit of the invention.

Referring to FIG. 1 an embodiment of a drill bit is shown generally at 1 and comprises a shank 2 having a quick coupling 4 disposed at a first end thereof. The quick connect coupling 4 may comprise a plurality flat faces 4a adapted to be received and retained in a chuck of a rotary tool such as a screwdriver or power driver. A recess 4b may be formed around the circumference of the shank to be releasably engaged by the quick connect coupler of the rotary tool. Other configurations of shank 2 may also be used for coupling the drill bit to a rotary drive tool.

Figure 3:
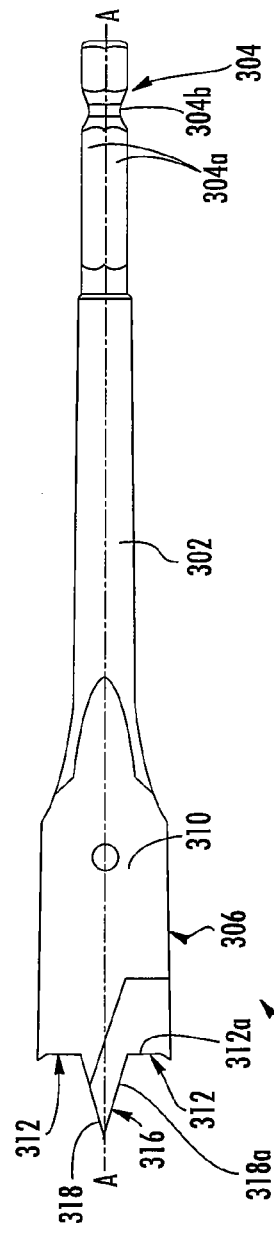
FIG. 3 is a side view of yet another embodiment of the drill bit of the invention.

A cutting head 6 is formed on the opposite end of shank 2 from quick connect coupling 4. The cutting head 6 is intended to cut wood and may include a plurality of flutes 8 defining a plurality of ribs 10 therebetween. In the embodiment of FIG. 1 three flutes and ribs are shown although the cutting head may have a different number flutes and a variety of designs. Each rib 10 has a cutting face 12 formed at the distal end thereof. Each cutting face 12 may be formed with a bevel angle to create a sharp cutting edge 12a on each of the ribs for cutting the material as the drill bit rotates. The cutting face typically extends from the side edges of ribs 10 to a pilot tip 16 located along the longitudinal axis A-A of the drill bit. In the illustrated embodiment the pilot tip 16 is a screw 18 having threads 18a for centering the bit and feeding the bit through the wood. The screw 18 may be replaced by a point as shown in FIG. 3. The pilot tip 16 is made removable and replaceable such that a broken tip may be replaced. With a replaceable pilot tip the tip may be made out of high speed steel (HSS) as a separate component.

Figure 2:
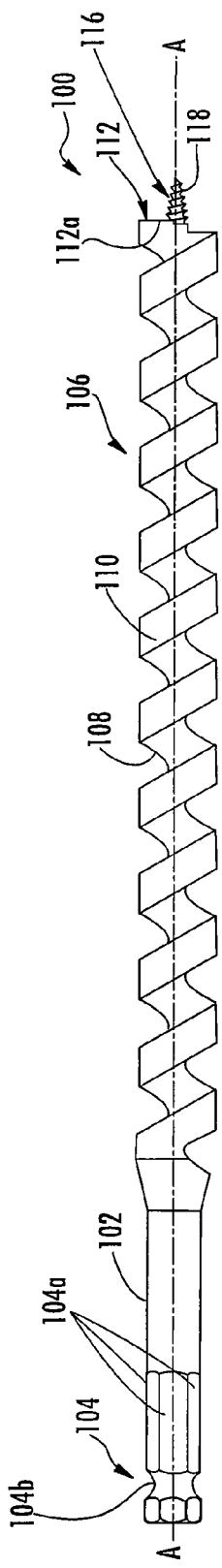
FIG. 2 is a side view of another embodiment of the drill bit of the invention.

A second embodiment of a drill bit is shown in FIG. 2 comprising a single flute wood auger 100. Wood auger 100 comprises a shank 102 having a quick coupling 104 disposed at a first end thereof. The quick connect coupling 104 may comprise a plurality flat faces 104a and a recess 104b, as previously described, that may be releasably engaged by the quick connect coupler of the rotary tool.

A cutting head 106 is formed on the opposite end of shank 102 from quick connect coupling 104. The cutting head 106 is intended to cut wood and may include a single flute 108 defining a rib 110. Rib 110 has a cutting face 112 formed at the distal end thereof. The cutting face 112 typically extends from the side edge of rib 110 to a pilot tip 116 located along the longitudinal axis A-A of the auger. Cutting face 112 is formed with a bevel angle to create a sharp cutting edge 112a for cutting the material as the auger rotates. In the illustrated embodiment the centering point 116 is a screw 118 having threads for centering the auger and feeding the auger through the wood. The screw 118 may be replaced by a point as shown in FIG. 3. The screw is removable and replaceable as previously described.

A third embodiment of a drill bit is shown in FIG. 3 comprising a spade bit 300. Spade bit 300 comprises a shank 302 having a quick coupling 304 disposed at a first end thereof. The quick connect coupling 304 may comprise a plurality flat faces 304a and a recess 304b, as previously described, that may be releasably engaged by the quick connect coupler of the rotary tool.

A cutting head 306 is formed on the opposite end of shank 302 from quick connect coupling 304. The cutting head 306 is intended to cut wood and may include a relatively wide flat blade 310. Blade 310 has a pair of cutting faces 312 formed at the distal end thereof. Cutting faces 312 are formed with a bevel angles to create sharp cutting edges 312a for cutting the material as the bit rotates. The cutting faces 312 typically extend from the side edges of cutting head 306 to a pilot tip 316 located along the longitudinal axis A-A of the drill bit. In the illustrated embodiment the pilot tip 316 is a point 318 having substantially straight cutting edges 318a formed on opposite sides of point 318 for boring a pilot hole in the material being drilled to center and guide the bit. The point 318 may be replaced by a screw as shown in FIGS. 1 and 2. The lead point is removable and replaceable as previously described.

Referring to FIGS. 4 and 5 the pilot tip is shown as a screw tip 30 having a first externally threaded screw stem 32 that engages an internally threaded bore 34 formed at the cutting head 36 of the drill bit. The threads 32 are arranged such that the tip will tend to be tightened into the cutting head 36 when the drill bit is rotated into the workpiece. The pilot tip has a leading end 38 that is shown formed with a tapered screwthreads 40 that engage the workpiece during a boring operation to lead or guide the drill bit through the workpiece. While a particular embodiment of a screw tip is illustrated it is to be understood that the screw tip may have a wide variety of configurations suitable for leading the drill bit through a workpiece. Further the threaded screw tip may be replaced by a pilot point as illustrated in FIG. 3. With either a screw tip or a pilot point the pilot tip has a cutting member for cutting the material of the workpiece when the drill bit is rotated. In the case of a screw tip the cutting member comprises the threads and in the case of the pilot point the cutting member comprises the straight cutting edges.

A neck portion 42 connects the threaded portion 32 to the screw tip 30. The neck portion 42 is designed to provide a controlled break point and to allow the broken tip to be removed from the bit. The neck portion 42 includes a narrowed web 44 that has a smaller cross-sectional area than the remainder of the pilot tip such that if the screw tip contacts an obstruction in the workpiece the tip will fail in the narrow web 44 rather than at the screw stem 32 or at the leading end 38. The pilot tip 30 may fail, for example, if it strikes a nail or screw embedded in the workpiece being drilled.

As best shown in FIG. 5, the narrow web 44 is located at the upper surface 46 of the cutting head 36 when the tip is fully threaded into the bit. As a result when failure occurs at the narrow web 44 the tip will be broken flush or near flush with the surface 46 of the cutting head 36. This situation results from the desirability of having the last thread 48 on tip 30 be located at or below the cutting edge of the drill bit. By arranging the last thread 48 at or below the cutting edge of the bit, the pilot tip will "pull" the cutting edge into the workpiece. Because the tip 30 is broken off flush with the surface 46 of the drill bit, the screw stem 32 that remains threaded in the drill bit, will offer very little purchase for a tool to grasp for removing the screw stem. To remove the broken screw stem 32 from the drill, the web 44 is provided with opposed flat faces 50 and 52. The faces 50 and 52 extend at an angle β relative to the longitudinal axis of the bit. In one embodiment of the invention angle β is approximately 20 degrees. The flat faces 50 and 52 create opposed cavities 54 and 56 between the screw stem 32 and the internally threaded bore 34. By angling the faces slightly clearance is provided for inserting a tool between the screw stem 32 and bore 34. The cavities 54 and 56 are covered by the leading end 38 when the tip is attached to the cutting head such that dirt and debris are prevented from entering the cavities during use of the bit.

Figure 6:
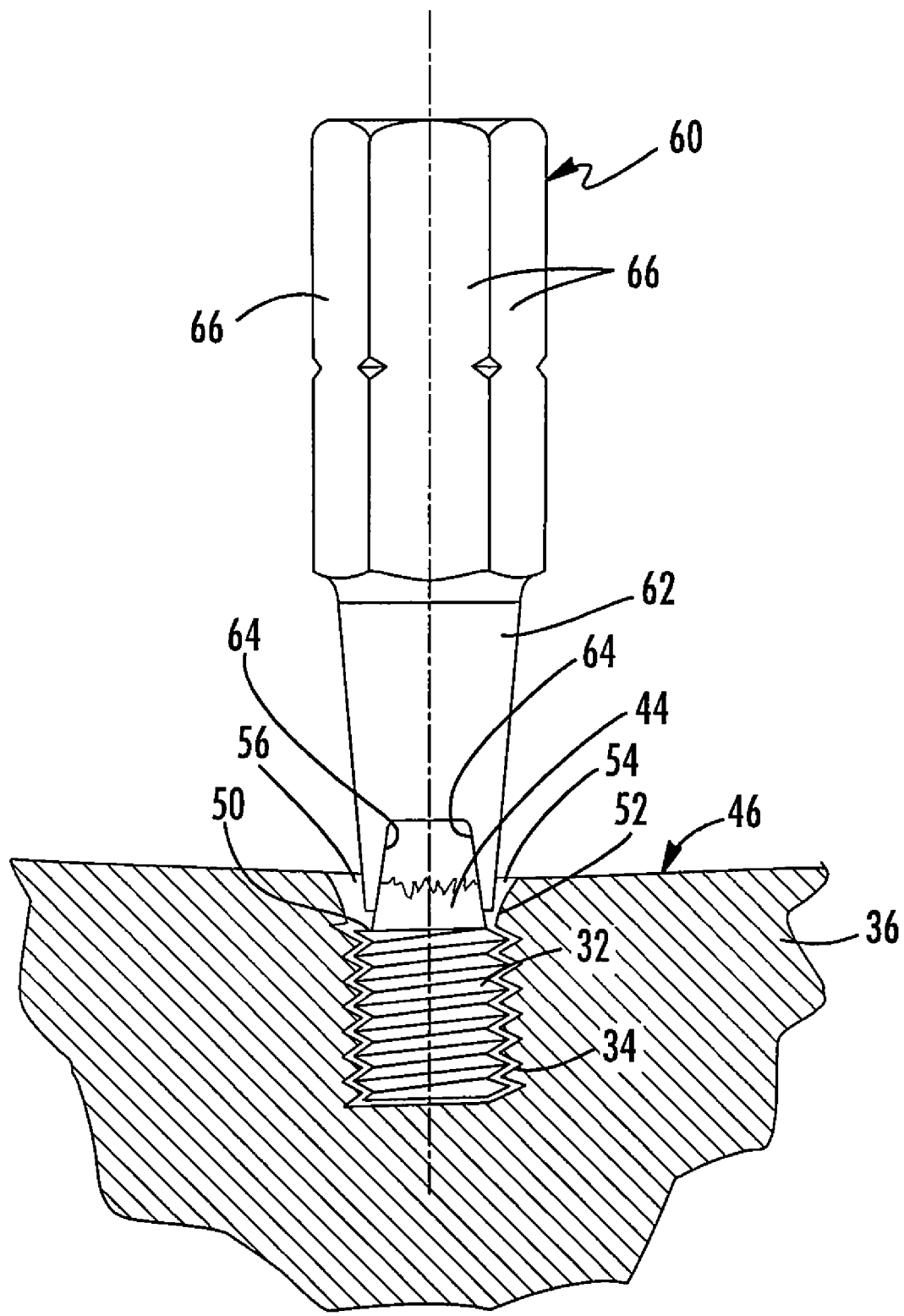
FIG. 6 is a side view of the embodiment of a pilot tip of FIG. 5 in a broken condition with a removal tool.

The removal tool 60 is shown in FIG. 6 engaging a broken tip. The tool 60 comprises a shaft 62 having a plurality of flat faces 66 formed at one end thereof. The faces 66 can be gripped by hand or can be inserted into the chuck of a tool such as a rotary driver or can be gripped by a hand tool such as a pliers or wrench. The opposite end of the tool has a pair of opposed fixed jaws 64 that are dimensioned to fit into the cavities 54 and 56 created between the screw stem 32 and the bore 34. The jaws 64 have faces that are shaped and dimensioned to closely engage the faces 50 and 52 on the screw stem 32 such that when the tool 60 is rotated the screw stem 32 can be unthreaded and removed from bore 34.

Figure 7:
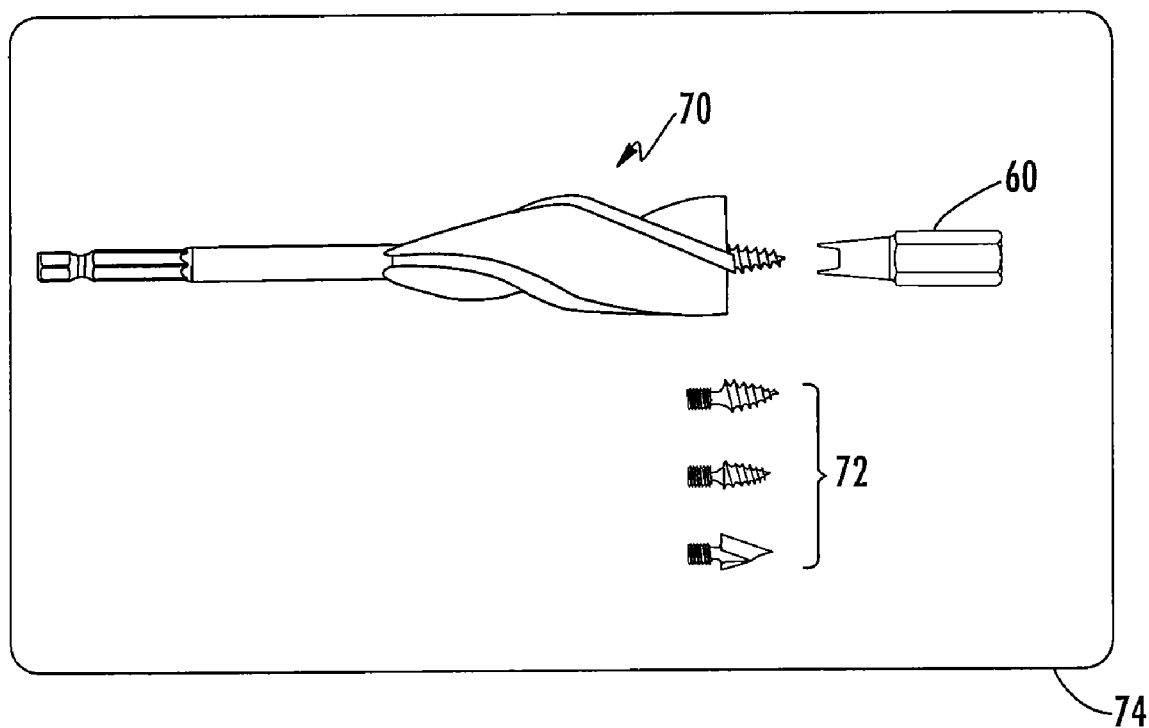
FIG. 7 is a plan view of a kit containing a drill bit, pilot tips and removal tool.

In one embodiment the drill bit, tool and extra lead tips are sold in a kit as best shown in FIG. 7. A drill bit 70, removal tool 60 and extra tips 72 are packaged as a kit 74 such that the user can purchase all of the components as a kit. The kit 74 may be packaged, for example, in a disposable carton such as a clear plastic sleeve or in a reusable case such as a plastic clam shell case. The components may also be sold independently or as subsets of the entire kit. For example, the drill bit 70 may be sold separately and the extra tips 72 and removal tool 60 sold as a kit. Further, more than one drill bit may be included as part of the kit. The extra tips 72 may include tips having various configurations. For example, different screw tips may be provided in the kit where the tips have different characteristics such as different thread pitch, materials, dimensions or the like. Further, screw tips and lead points may be provided in the same kit. In this manner the user has maximum flexibility in customizing the bit for different applications and has the ability of removing and replacing damaged tips with the same or different tips.

Figure 8:
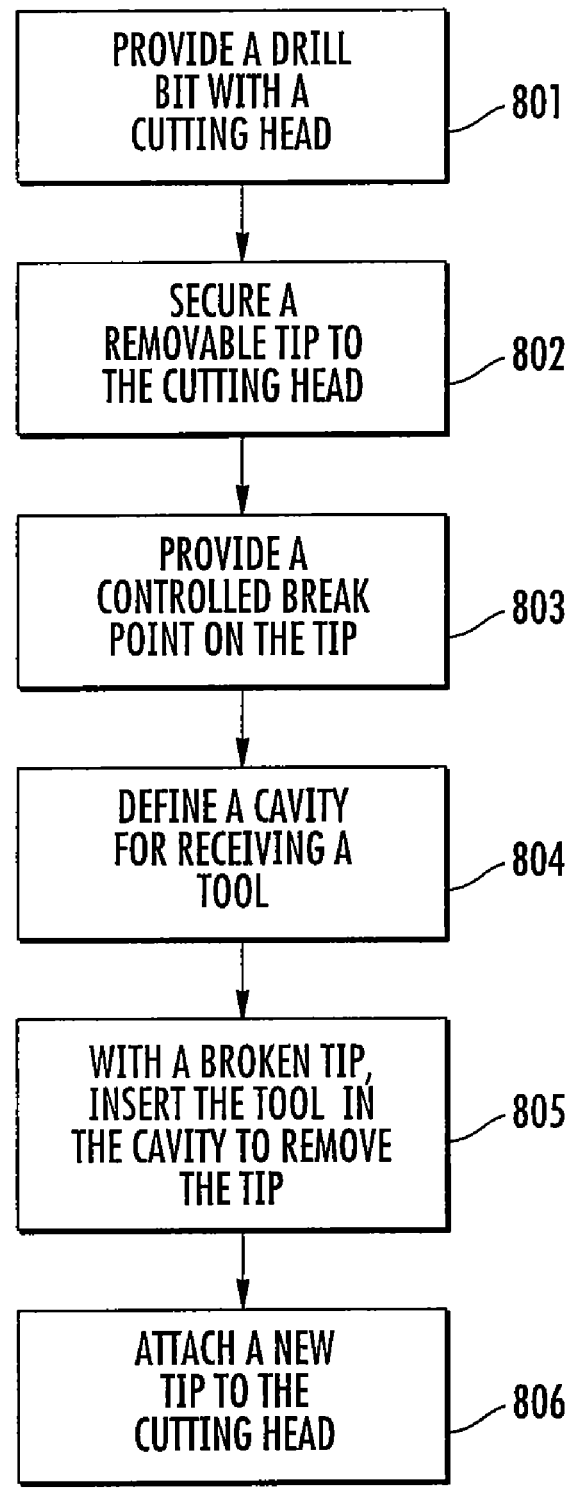
FIG. 8 is a flow chart illustrating one embodiment of a method of using the drill bit of the invention.

A method for using the drill bit is shown in FIG. 8 where a drill bit having a cutting head is provided (block 801). A removable tip is provided where the tip may be attached to the drill bit when it is purchased or a user may attach the tip to the drill bit after purchase (block 802). The tip is attached to the drill bit by threading the screw stem 32 into threaded bore 34. A controlled break point is provided on the tip as previously described such that the tip will fail flush with or near flush with the surface of the cutting head (block 803). When the tip is secured to the cutting head a cavity is defined between the tip and the cutting head for receiving a tool (block 804). If the tip fails, a removal tool is inserted into the cavity to engage the tip such that the screw stem can be rotated relative to the cutting head to remove the tip from the cutting head (block 805). A new tip can be attached to the drill bit by inserting the new tip into the threaded bore 34 and rotating the tip to screw the tip into the cutting head (block 806). The process may be repeated as necessary.

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

The invention claimed is:
1. A drill bit comprising:
a shaft;
a cutting head formed on the shaft;
a removable tip having a stem and a leading end, said stem threadably engaged with a threaded bore formed in the cutting head, said removable tip having a controlled break point between the stem and the leading end where the tip will break if a force above a predetermined force is applied to the tip wherein the cutting head has a cutting edge and said controlled break point is arranged from a point substantially flush with the cutting edge toward the shaft, the controlled break point comprising a narrow web that includes a flat face arranged such that a cavity is created between the flat face and the threaded bore that is dimensioned to receive a tool, said cavity being covered by said tip.

2. The drill bit of claim 1 wherein the tip has a cutting member for engaging a workpiece.

3. The drill bit of claim 1 wherein the tip has threads for engaging the cutting head, said controlled break point being located between the cutting member and the threads.

4. The drill bit of claim 2 wherein the cutting member is a screw.

5. The drill bit of claim 2 wherein the cutting member is a lead point.

6. The drill bit of claim 1 wherein the controlled break point is approximately flush with an exterior surface of the cutting head.

7. The drill bit of claim 1 wherein the bit is a spade bit.

8. The drill bit of claim 1 wherein the bit is a fluted bit.

9. The drill bit of claim 1 wherein the bit is an auger.

10. A kit comprising:
a drill bit having a cutting head formed with a threaded bore adapted to receive a removable tip;
a removable tip having a stem and a leading end, said stem threadably engaged with said threaded bore, said removable tip having a controlled break point between the stem and the leading end where the tip will break if a force above a predetermined force is applied to the tip wherein the cutting head has a cutting edge and said controlled break point is arranged from a point substantially flush with the cutting edge toward the shaft, the controlled break point comprising a narrow web that includes a flat face arranged such that a cavity is created between the flat face and the threaded bore that is dimensioned to receive a tool, said cavity being covered by said tip and a removal tool dimensioned to fit into said cavity for removing a broken stem from the threaded bore.

11. The kit of claim 10 further comprising: a plurality of removable tips for engaging said cutting head.

12. The kit of claim 11 wherein the tool includes a pair of fixed jaws, said fixed jaws dimensioned to engage said flat face and a second flat face formed on the removable tip.

13. A method for removing a tip from a drill bit comprising:
providing a cutting head having a bore on the drill bit;
providing a removable tip having a stem extending into said bore;
providing a controlled break point on the tip, said controlled break point comprising a narrow web that includes a flat face;
defining a cavity arranged between the flat face and the threaded bore that is dimensioned to receive a tool;
inserting a tool into said cavity to remove the tip from the cutting head; and
inserting another tip into the cutting head.

* * * * *